(12) United States Patent
Steele

(10) Patent No.: US 12,553,801 B2
(45) Date of Patent: *Feb. 17, 2026

(54) GAS SAMPLING VALVE APPARATUS AND METHOD

(71) Applicant: STRATUM RESERVOIR (ISOTECH), LLC, Houston, TX (US)

(72) Inventor: Gavin Steele, White Heath, IL (US)

(73) Assignee: Stratum Reservoir (Isotech), LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/947,805

(22) Filed: Nov. 14, 2024

(65) Prior Publication Data
US 2025/0164354 A1 May 22, 2025

Related U.S. Application Data

(60) Provisional application No. 63/607,545, filed on Dec. 7, 2023, provisional application No. 63/599,659, filed
(Continued)

(51) Int. Cl.
*G01N 1/22* (2006.01)

(52) U.S. Cl.
CPC ... *G01N 1/2226* (2013.01); *G01N 2001/2238* (2013.01)

(58) Field of Classification Search
CPC .................. G01N 1/2226; G01N 2001/2238; F16K 1/30; F16K 1/308; F16K 1/306;
(Continued)

(56) References Cited

U.S. PATENT DOCUMENTS

| | | | |
|---|---|---|---|
| 3,842,677 A | 10/1974 | Bufkin et al. | |
| 4,007,909 A | * 2/1977 | Buseth | F16L 29/007 |
| | | | 251/149.6 |

(Continued)

FOREIGN PATENT DOCUMENTS

| | | | | |
|---|---|---|---|---|
| CA | 3030498 C | * 6/2020 | ........... | E21B 23/006 |
| CN | 112945631 | 6/2021 | | |

(Continued)

OTHER PUBLICATIONS

Patent Cooperation Treaty; International Search Report and Written Opinion; PCT/US2024/055998, Dec. 26, 2024.
(Continued)

*Primary Examiner* — Fatemeh Esfandiari Nia
(74) *Attorney, Agent, or Firm* — Morgan, Lewis & Bockius LLP

(57) ABSTRACT

A valve assembly and chuck system for a gas sampling apparatus. In one embodiment, the apparatus may comprise a valve assembly comprising a first core valve, wherein a pin of the first core valve is biased to a first closed position; a chuck system comprising a second core valve, wherein a pin of the second core valve is biased to a first closed position; and a transfer tube housed within the chuck system, wherein the transfer tube provides a means of displacing the pins of the first and second core valves to a second open position; wherein the transfer tube isolates a fluid communication path between the first and second core valves. In an alternate embodiment, the chuck system may not comprise a second core valve, and the transfer tube may isolate a fluid communication path between the first core valve and the chuck system.

15 Claims, 15 Drawing Sheets

Related U.S. Application Data on Nov. 16, 2023, provisional application No. 63/599,638, filed on Nov. 16, 2023.

(58) Field of Classification Search
CPC .......... F16K 1/00; F16K 17/406; F16K 17/00; F17C 13/00; B65D 83/42; B65D 83/425
See application file for complete search history.

(56) References Cited

U.S. PATENT DOCUMENTS

| | | | |
|---|---|---|---|
| 4,552,219 A * | 11/1985 | Wong | E21B 34/106 166/321 |
| 5,600,075 A | 2/1997 | Peterson | |
| 7,757,572 B2 | 7/2010 | Coleman et al. | |
| 2003/0217774 A1 | 11/2003 | Markham et al. | |
| 2014/0174208 A1 | 6/2014 | Coleman et al. | |
| 2019/0170615 A1 * | 6/2019 | Coleman | G01N 1/22 |
| 2021/0190400 A1 | 6/2021 | Auyer et al. | |
| 2023/0358328 A1 * | 11/2023 | Quintana | F16K 15/066 |

FOREIGN PATENT DOCUMENTS

| | | | |
|---|---|---|---|
| EP | 2016324 B1 * | 7/2011 | F16L 37/23 |
| WO | 2023019011 | 2/2023 | |

OTHER PUBLICATIONS

Patent Cooperation Treaty; International Search Report, PCT/US2023/079855, Mar. 28, 2024.
Patent Cooperation Treaty; Written Opinion, PCT/US2023/079855, Mar. 28, 2024; mailed Apr. 10, 2024.

* cited by examiner

GAS SAMPLING VALVE APPARATUS AND METHOD

CROSS-REFERENCE TO RELATED APPLICATIONS

This application claims priority to U.S. Patent Application No. 63/599,638 filed Nov. 16, 2023; U.S. Patent Application No. 63/599,659, filed Nov. 16, 2023; and U.S. Patent Application No. 63/607,545 filed Dec. 7, 2023, each entitled GAS SAMPLING VALVE APPARATUS AND METHOD, the contents of which are incorporated by reference as if fully set forth herein.

FIELD OF THE INVENTION

The present invention relates to the collection, transportation, and analysis of fluid samples which may be desired in various scientific, environmental, and resource contexts. More specifically, the present invention relates to pressurized container valves and valve actuating apparatuses and methods.

BACKGROUND OF THE INVENTION

Pressurized gas sampling containers may be commonly used in the collection, transportation and analysis of gas samples which may be required in various scientific, environmental and resource contexts. The oil and gas industry may provide an exemplary context in which to examine the need for collecting, transporting and analyzing fluid samples. The details and operation of a gas sampling apparatus are described in U.S. Pat. Nos. 9,983,103 and 9,234,822, the entire contents of which are incorporated herein by reference thereto.

In oil and natural gas exploration, drilling, recovery and storage, periodic sampling of recovered gases and fluids may be required for subsequent analysis. For example, the term "mud" may be used as a colloquial term for a thick chemical composition that is pumped into drills as they penetrate the substrate. This "mud" may be subsequently returned to the surface and may contain gases that are released from the rock as the drill penetrates through a geological formation. Significant data of interest may be acquired by analyzing these gases. Separately, in the context of natural gas storage, large underground storage deposits may often be chemically tagged for later identification.

The apparatus and methods disclosed herein may improve the methods through which collection, transportation, and analysis of samples from these exemplary industrial applications may be performed, providing benefits in the process of obtaining such drilling data or identifying such chemical tags. The apparatus and methods may have suitable application across a number of industries beyond oil and gas.

BRIEF SUMMARY OF SOME OF THE PREFERRED EMBODIMENTS

The embodiments disclosed herein may comprise a valve assembly and chuck system for a gas sampling apparatus. In one embodiment, the apparatus may comprise a valve assembly comprising a first core valve, wherein a pin of the first core valve is biased to a first closed position; a chuck system comprising a second core valve, wherein a pin of the second core valve is biased to a first closed position; and a transfer tube housed within the chuck system, wherein the transfer tube provides a means of displacing the pins of the first and second core valves to a second open position; wherein the transfer tube isolates a fluid communication path between the first and second core valves.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
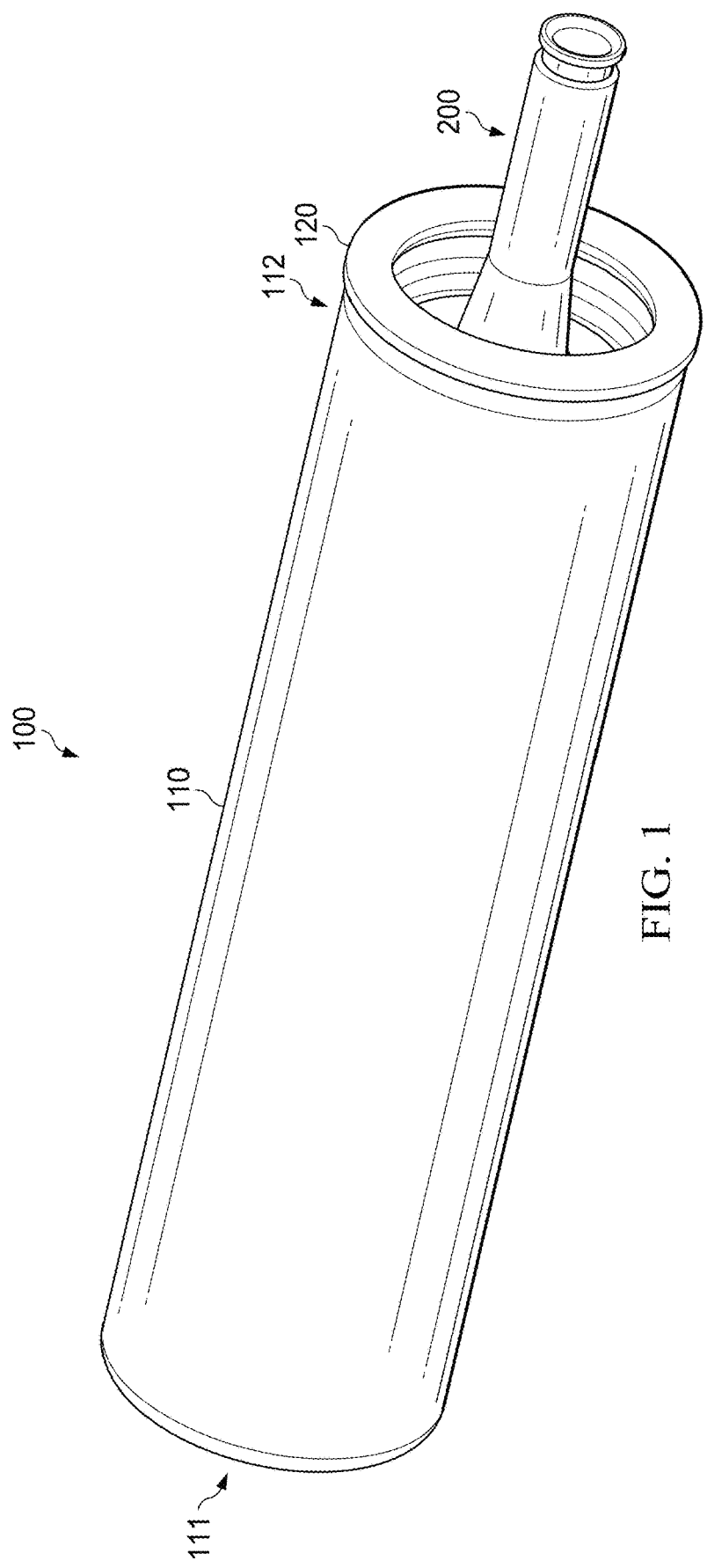
FIG. 1 illustrates an isometric view of an embodiment of a gas sampling container.
Figure 2:
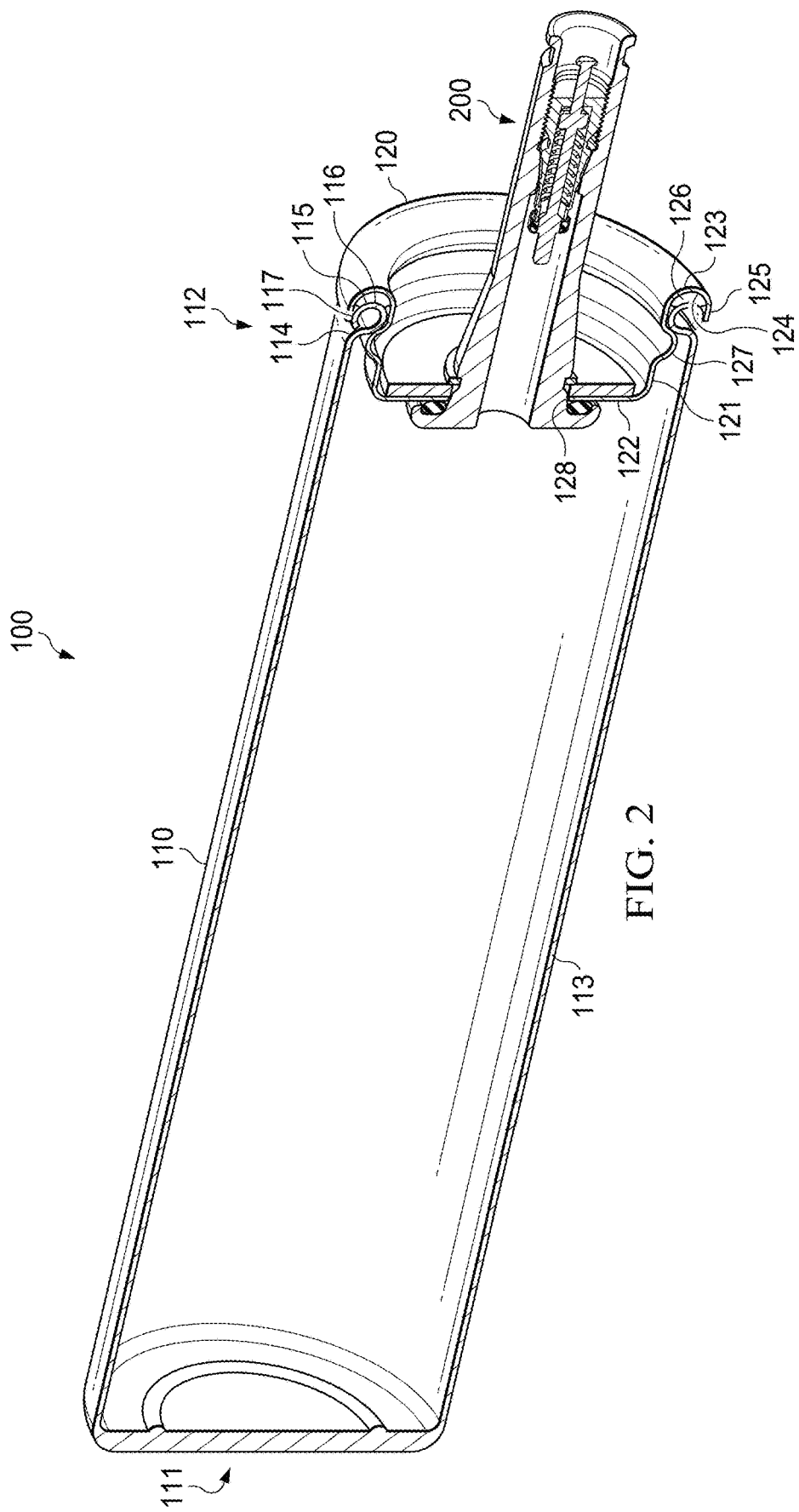
FIG. 2 illustrates an isometric view of an embodiment of a gas sampling container cap and valve assembly.

FIGS. 1-2 illustrate an embodiment of fluid container 100, comprising container body 110 having closed first end 111 and open second end 112, cap 120, and valve assembly 200.

Container body 110 may comprise container wall 113 which may extend from closed first end 111 toward second open end 112. In embodiments, open second end 112 may comprise rolled lip 114 formed by container wall 113 being formed inward toward the longitudinal midline of container body 110 then outward to such an extent that container wall 113 touches itself at point 115, thus forming rolled lip 114 having outer curved surface 116.

Cap 120 may be cup shaped and formed having a diameter such that cap sides 121 may communicate with rolled lip 114 while allowing cap bottom 122 to slide within container body 110, allowing partially rolled flange 123 to also communicate with rolled lip 114. Partially rolled flange 123 may be formed in such a way as to allow inner curved surface 124 to communicate with outer curved surface 116 of rolled lip 114. Cap 120 may further comprise aperture 128 which may be adapted to receive valve assembly 200.

Container body 110 and cap 120 may be composed of any substance of suitable strength for containing compressed or pressurized gasses or liquids. In embodiments, container body 110 or cap 120 may be formed of any suitable metallic or non-metallic material, for example aluminum, steel, or other suitable materials.

One or more sealing elements 126 may be disposed between inner curved surface 124 of partially rolled flange 123 and outer curved surface 116 of rolled lip 114. Each of the one or more sealing elements 126 may be annular in shape and rest on inner curved surface 124, such that when cap 120 is fully inserted into container body 110, partially rolled flange 123 may communicate with the one or more sealing elements 126, which in turn may communicate with outer curved surface 116 of rolled lip 114, forming an air or gas tight seal. Partially rolled flange 123 may then be rolled or crimped, which may cause flange end 125 to be pressed under rolled lip 114 at point 117. In embodiments, the crimping may be performed from inside-underneath at lip 127 or may be performed from the outside at point 117. In this manner, cap 120 may be attached to container body 110 after the crimp is formed. This may tightly compress the one or more sealing elements 126, which may allow fluid container 100 to be so tightly sealed as to allow fluid container 100 to contain compressed or pressurized gasses or liquids. In an alternate crimping method, a portion of cap sides 121 may be expanded into cap side lip 127 such that cap side lip 127 may apply pressure under rolled lip 114, which may further enhance the ability of fluid container 100 to contain compressed or pressurized gasses or liquids.

Figure 5:
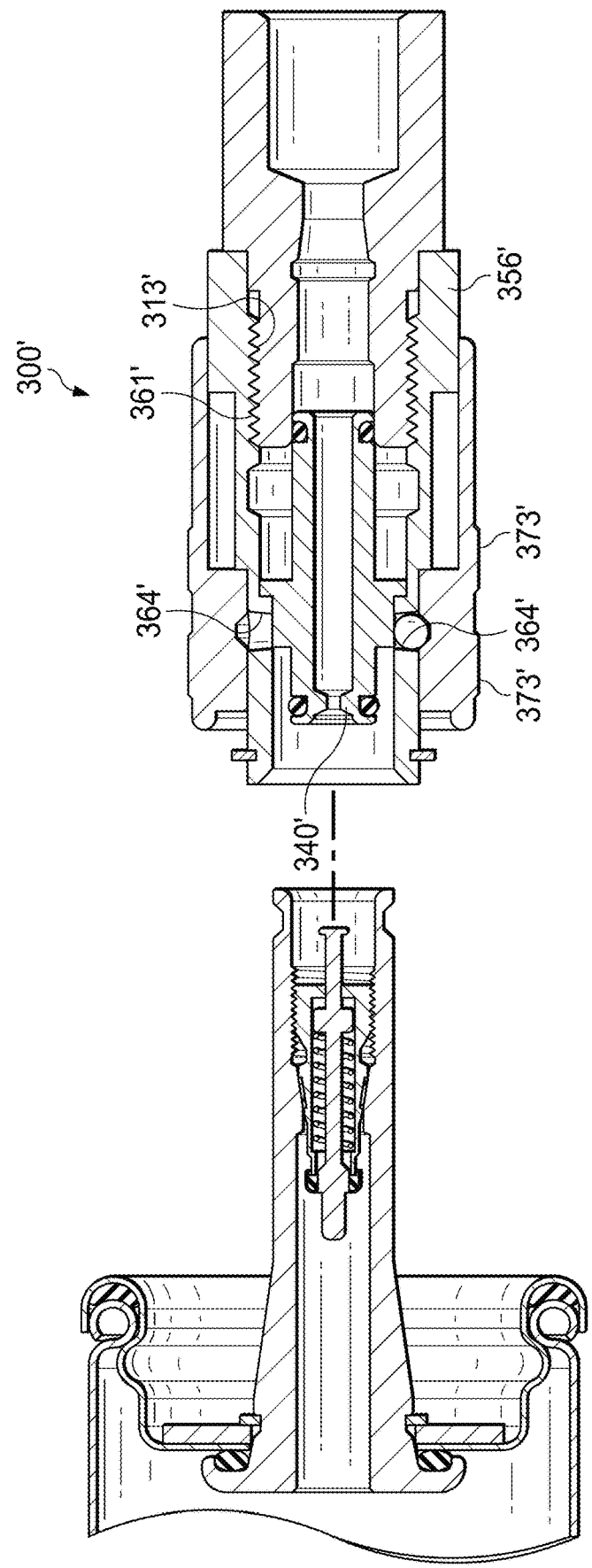
FIG. 5 illustrates an alternate embodiment of a chuck system comprising a single core valve.

FIGS. 3A-3G illustrate an embodiment of cap 120, valve assembly 200, and chuck system 300, wherein valve assembly 200 may comprise valve body 220 and first core valve 400 $b$, and chuck system 300 may comprise chuck body 310, transfer tube 330, ball cage 350, locking sleeve 370, and second core valve 400 $b$. FIG. 5 illustrates an alternate embodiment of chuck system 300' which does not comprise second core valve 400 $b$, and instead comprises alternate embodiments of chuck body 310, transfer tube 330, ball cage 350, and locking sleeve 370.

Figure 3A:
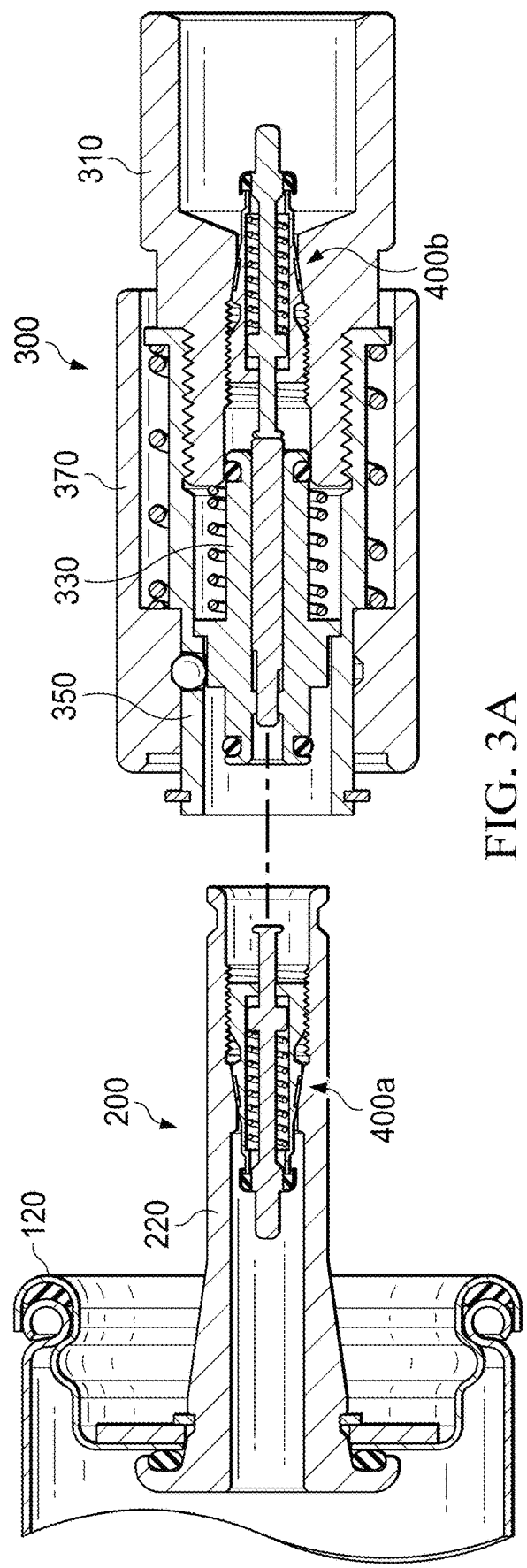
FIG. 3A illustrates cross-sectional views of an embodiment of a gas sampling valve assembly and chuck system.
Figure 3B:
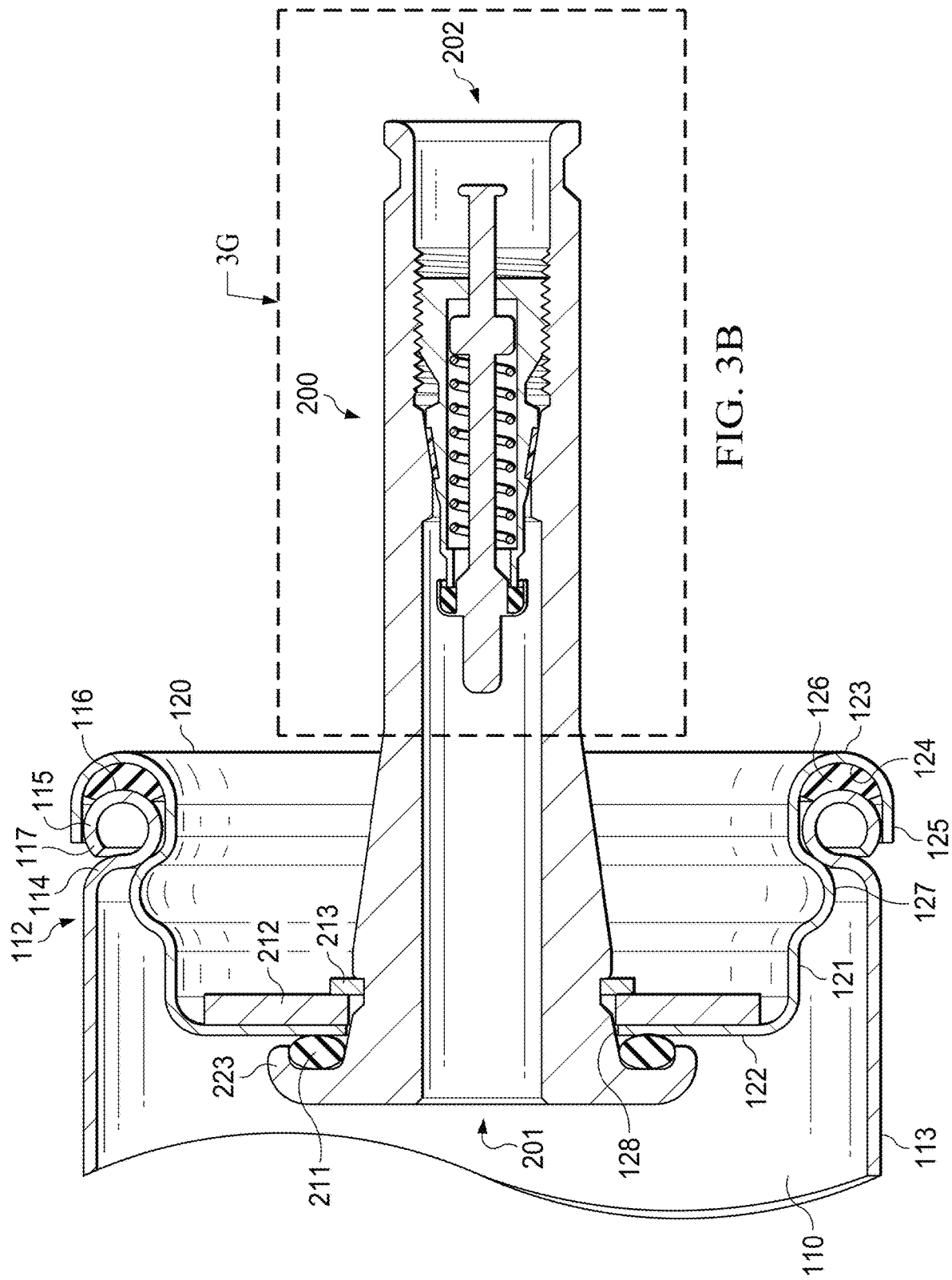
FIG. 3B illustrates cross-sectional views of an embodiment of a gas sampling valve assembly.

As shown in FIG. 3B, valve assembly 200 having first end 201 and second end 202 may be received by aperture 128 of cap 120 and secured in place having one or more sealing elements 211 disposed between valve body flange 223 and a first surface of cap bottom 122, and washer 212 disposed between retaining ring 213 and a second surface of cap bottom 122 as shown, such that valve assembly first end 201 is interior to fluid container 100 and valve assembly second end 202 is exterior to fluid container 100 when fluid container 100 is configured in an operable state. Each of the sealing elements 211 may be any suitable sealing element, for example an O-ring, and may be formed from any suitable material, for example, nitrile rubber, viton, silicone, or any suitable elastomer. In embodiments, washer 212 and retaining ring 213 may be formed of suitable metallic or non-metallic material, for example stainless steel, steel, or other suitable material.

Figure 3C:
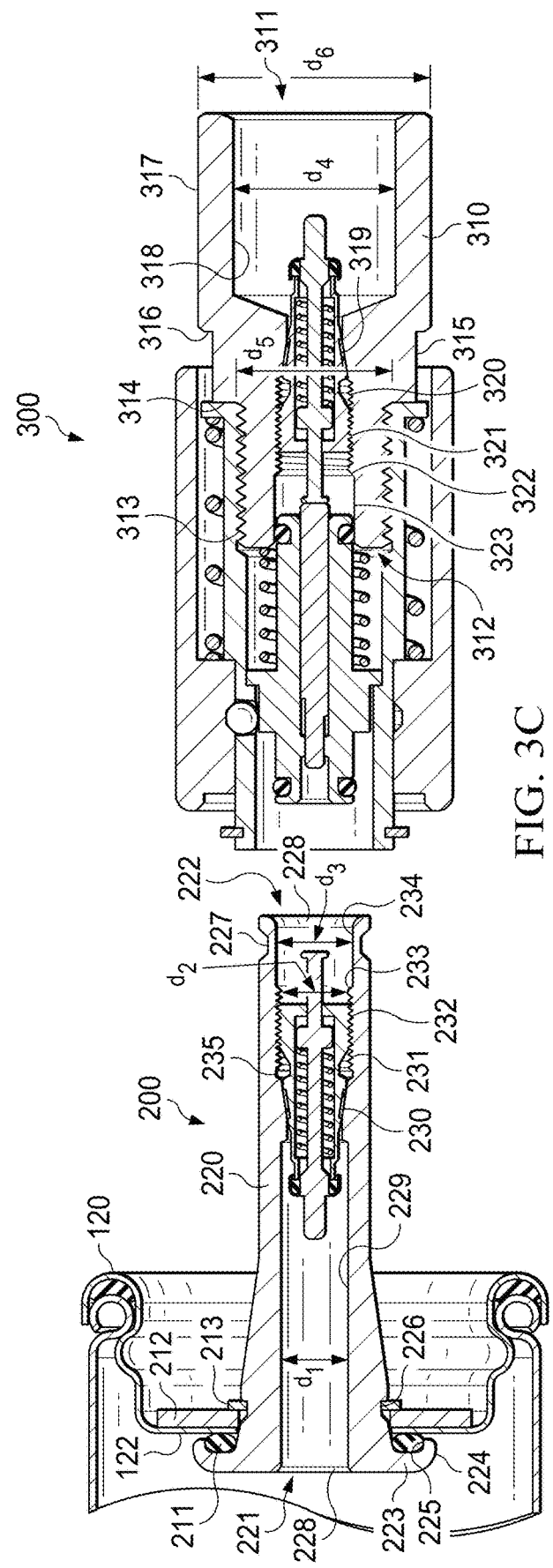
FIG. 3C illustrates cross-sectional views of an embodiment of a gas sampling valve assembly and chuck system.

As shown in FIG. 3C, valve body 220 may be formed having a central bore extending between first end 221 and second end 222, and may be formed of any suitable metallic or non-metallic material, for example brass or aluminum. Similarly, chuck body 310 may be formed having a central bore extending between first end 311 and second end 312, and may be formed of any suitable metallic or non-metallic material, for example brass, aluminum, or stainless steel.

Valve body 220 may comprise flange 223 at first end 221 which may be partially rolled, forming lip 224 having an inner surface 225 which may communicate with the one or more sealing elements 211, which in turn may communicate with the first surface of cap bottom 122. Valve body 220 may be provided with outer recessed profile 226 which may receive retaining ring 213, wherein outer recessed circumferential profile 226 may be located about first end 221 such that when retaining ring 213 is fully seated, retaining ring 213 may communicate with washer 212 which in turn may communicate with the second surface of cap bottom 122. In this manner retaining ring 213 may cause valve body 220 to be biased outwardly relative to fluid container 100, thus compressing the one or more sealing elements 211 against the first surface of cap bottom 122, forming the air or gas tight seal. Valve body 220 may be provided with outer recessed circumferential profile 227 which may be located about valve body second end 222 and may be adapted to receive one or more balls 365. The outer surface of valve body 220 may further comprise one or more chamfered surfaces 228.

Chuck body 310 may be formed having a stepped outer profile which may comprise a number of segments. Traversing longitudinally from chuck body second end 312 to chuck body first end 311, first segment 313 may be formed having an externally threaded outer diameter $d_5$, and may abut chuck body outer shoulder 314. Second segment 315 may extend from chuck body outer shoulder 314 to chuck body outer shoulder 316, and may be formed having a uniform outer profile. Third segment 317 may extend from chuck body outer shoulder 316 to chuck body first end 311, and may be formed having a uniform outer profile and outer diameter $d_6$. In the alternate embodiment illustrated in FIG. 5, chuck body 310 may be provided with outer profile first segment 313' having a threaded surface for connection to an alternate embodiment of ball cage 350.

Valve body 220, chuck body 310 may be formed having a central bore extending from first end 221,311 to second end 222,312 and having internal diameter $d_1,d_4$ and uniform internal surface 229,318 which may extend from first end 221,311 to core valve seat 230,319.

Core valve seat 230,319 may be formed having a reduced internal diameter which may expand conically in a longitudinal direction traversing from first end 221,311 toward second end 222,312 in a manner adapted to receive core body valve seat 416 $a,b$. Core valve seat 230 of valve body 220 may abut internal recessed profile 235, which may abut internal surface 231 having diameter $d_2$. Core valve seat 319 of chuck body 310 may abut internal surface 320 having diameter $d_2$. Internal surface 231,320 may be formed having internal threads 232,321 which may be adapted for threaded connection with corresponding external threads 418 $a,b$ of core valve 400 $a,b$. Internal shoulder 233,322 may be formed having a profile adapted to receive transfer tube first end 331 or second end 332, respectively, expanding to internal surface 234,323 having internal diameter $d_3$ which may be adapted to slidably receive a mating portion of transfer tube first segment 333 or fourth segment 338, respectively.

Figure 3D:
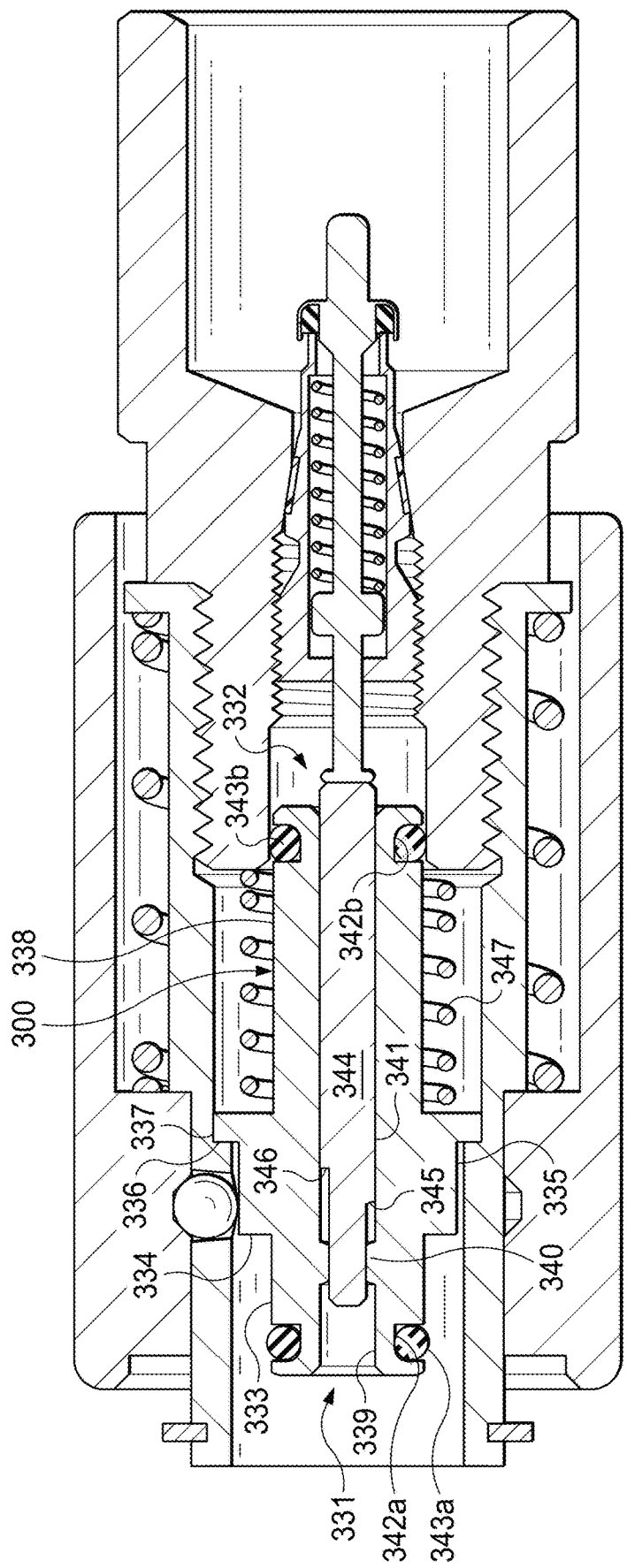
FIG. 3D illustrates cross-sectional views of an embodiment of a chuck system.

As illustrated in FIG. 3D, transfer tube 330 may comprise first end 331 and second end 332, and may be formed having a central bore adapted to receive pin 344. Transfer tube 330 may be formed of any suitable metallic or non-metallic material, for example brass or aluminum. The outer profile of transfer tube 330 may be formed having a number of segments. Traversing longitudinally, first segment 333 may extend from transfer tube first end 331 through first external shoulder 334, and may consist of a mating profile allowing transfer tube first end 331 to be slidably received by valve body internal surface 234 having diameter $d_3$. Second segment 335 may extend from first external shoulder 334 to second external shoulder 336 and may be formed having an outer diameter allowing second segment 335 to travel within ball cage first internal segment 357. Third segment 337 may comprise an abbreviated external profile forming second external shoulder 336 at a first end and providing a seat at a second end against which biasing element 347 may be compressed. Fourth segment 338 may extend from the seat formed at the second end of third segment 337 to transfer tube second end 332. Transfer tube 330 may be formed having at first end 331 or second end 332 one or more recessed outer profiles 342 a,b adapted to receive one or more sealing elements 343 a,b which may prevent fluid communication past each of the one or more sealing elements 343 a,b when the mating portions of transfer tube first end 331 or second end 332 are received into valve body second end 222 or chuck body second end 312, respectively. Each of the one or more sealing elements 343 a,b may be any suitable sealing element sufficient to prevent fluid communication through the annular gap between transfer tube 330 and valve body 220 or chuck body 310, respectively, for example an O-ring, and may be formed from any suitable material, for example, nitrile rubber, viton, silicone, or any suitable elastomer. The central bore of transfer tube 330 may comprise a number of segments extending from first end 331 to second end 332. Traversing longitudinally, first segment 339 may be formed having a uniform internal profile extending from transfer tube first end 331 to raised internal profile 340. Raised internal profile 340 may be formed to allow pin 344 to slidably pass within raised internal profile 340 while communicating with one or more shoulders of pin 344 and thus restricting the longitudinal movement of pin 344 as will be described. Third internal segment 341 may be formed having a uniform internal profile extending from raised internal profile 340 to transfer tube second end 332. In the alternate embodiment illustrated in FIG. 5, transfer tube 330 may be provided with raised internal profile 340', which may be formed to have a smaller internal diameter than raised internal profile 340 and may be located close to or about first end 331.

Transfer tube pin 344 may be formed having a length such that when valve body second end 222 comes into resting contact against transfer tube first external shoulder 334, a first end of pin 344 may be in resting contact with core valve pin cap 437 a while a second end of pin 344 may be in resting contact with core valve pin cap 437 b. Pin 344 may be formed having an outer profile which allows a first end of pin 344 to slidably pass through transfer tube internal profile 340, while the travel of the first end of pin 344 through internal profile 340 may be restricted by pin shoulder 345. When pin shoulder 345 comes into contact with a second end of transfer tube internal profile 340, there may be formed an annular passage between pin 344 and internal profile 340 which may allow fluid communication between a first and second end of transfer tube internal profile 340. Pin 344 may also comprise shoulder 346. A second end of pin 344 may be formed to abut shoulder 346 and may comprise an outer profile allowing pin 344 to remain centrally positioned within transfer tube 330 while forming an annular gap between pin 344 and transfer tube third internal segment 341, wherein the annular gap may allow fluid communication between pin 344 and the internal profile of transfer tube 330. In an alternative embodiment, shoulder 346 may be eliminated, such that a flat surface extends along the length of transfer tube pin 344, thereby expanding the flow path through the transfer tube. Transfer tube pin 344 may be formed of any suitable metallic or non-metallic material, for example brass or stainless steel.

Transfer tube biasing element 347 may surround transfer tube 330 and may be compressed between the seat formed at the second end of third segment 337 and chuck body second end 312, which may bias transfer tube 330 to be configured in a first position with transfer tube second external shoulder 336 in resting contact against ball cage first internal shoulder 358. In this manner, transfer tube 330 may be biased to communicate with valve body 220, such that when a force is applied by valve body 220 against transfer tube 330, transfer tube 330 may travel toward a second configuration wherein transfer tube second end 332 comes into resting contact against chuck body internal shoulder 322, and transfer tube 330 is biased to return to the first configuration by biasing element 347 following a reduction in the force being applied by valve body 220 against transfer tube 330.

Figure 3E:
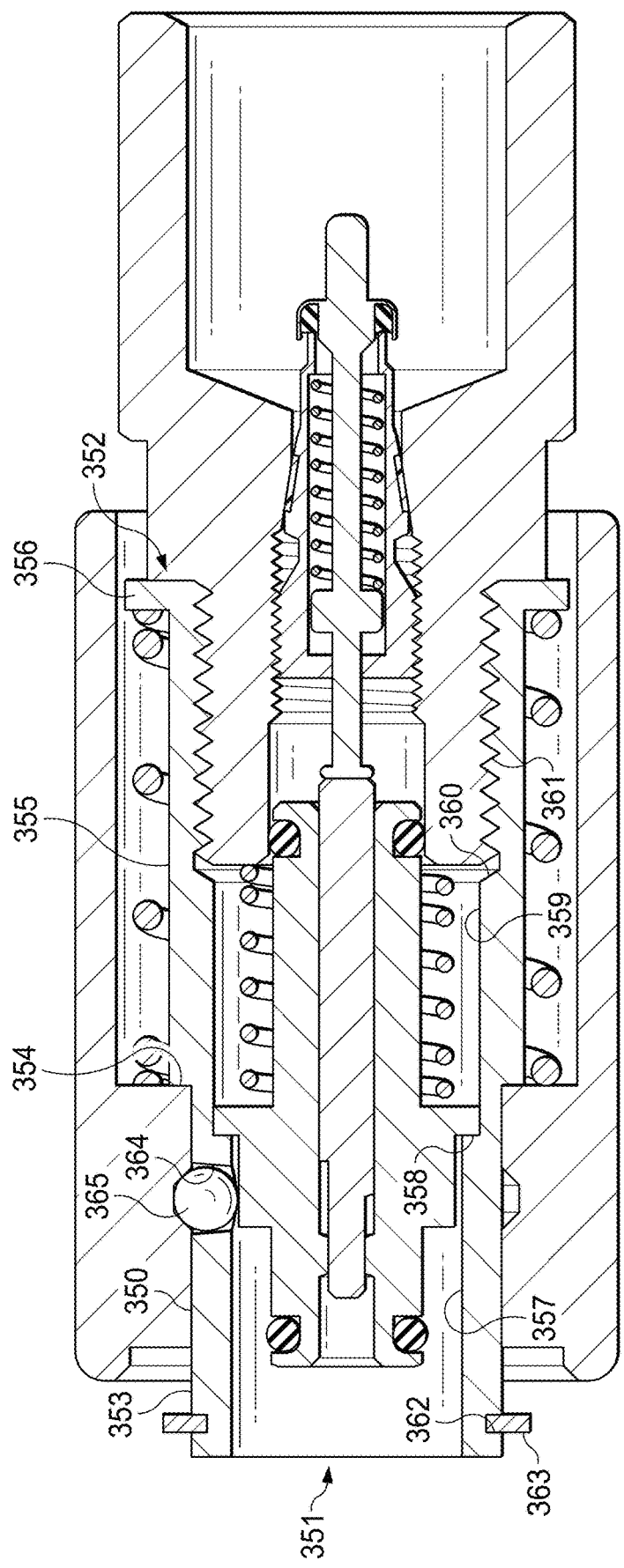
FIG. 3E illustrates cross-sectional views of an embodiment of a chuck system.

FIG. 3E illustrates ball cage 350 which may be generally tubular in nature, having first end 351 and second end 352, with an outer profile comprising a number of segments. Ball cage 350 may be formed of any suitable metallic or non-metallic material, for example brass, aluminum, or stainless steel. Ball cage first external segment 353 may comprise a uniform radial profile extending from first end 351 to external shoulder 354, having an outer diameter which may allow ball cage first end to slidably pass through locking sleeve first internal segment 374, while the travel of ball cage 350 through locking sleeve 370 may be restricted by external shoulder 354. Ball cage second external segment 355 may comprise a uniform radial profile extending from external shoulder 354 to abut flange 356, having an outer diameter allowing second external segment 355 to slidably pass through locking sleeve biasing element 379. Ball cage second end 352 may comprise flange 356, which may form a seat at a first end adapted to receive locking sleeve biasing element 379, and an outer diameter allowing flange 356 to slidably pass through locking sleeve second internal segment 376. In the alternate embodiment illustrated in FIG. 5, ball cage 350 may be formed having enlarged flange 356'.

Ball cage 350 may be formed having an internal profile comprising a number of segments. First internal segment 357 may extend from ball cage first end 351 to internal shoulder 358, having an internal profile adapted to receive transfer tube second external segment 335, and wherein internal shoulder 358 may restrict the travel of transfer tube 330 through ball cage 350. Second internal segment 359 may extend from internal shoulder 358 through internal seat 360, and may comprise a uniform radial profile, wherein internal seat 360 may be formed having a profile adapted to receive chuck body second end 312. Third internal segment 361 may extend from internal seat 360 to ball cage second end 352 and may comprise an internally threaded profile adapted to receive chuck body outer segment 313. In the alternate embodiment illustrated in FIG. 5, ball cage 350 may be provided with inner profile third segment 361' having a threaded surface for connection to an alternate embodiment of chuck body 310.

Ball cage first end 351 may comprise an outer recessed profile 362 adapted to receive retaining ring 363, wherein retaining ring may be sized to restrict travel of locking sleeve first end 371. One or more apertures 364 may be formed between first external segment 353 and first internal segment 357, which may be adapted to receive one or more balls 365. In embodiments, each of the one or more apertures 364 may be provided with sidewalls reducing in internal diameter progressing toward a centerline of ball cage 350, such that ball 365 may not fully pass through aperture 364, as shown by aperture 364' illustrated in FIG. 5. Balls 365 may be formed of any suitable metallic or non-metallic material, for example stainless steel. Each of the one or more balls 365 may be spherical in form and sized to project beyond the diameter of first external segment 353 when balls 365 may be in a first position in resting contact against transfer tube second external segment 335 and remain captured by apertures 364 when balls 365 may be in a second position seated within valve body outer recessed circumferential profile 227 when valve body second end 222 may be in resting contact against transfer tube first external shoulder 334.

Figure 3F:
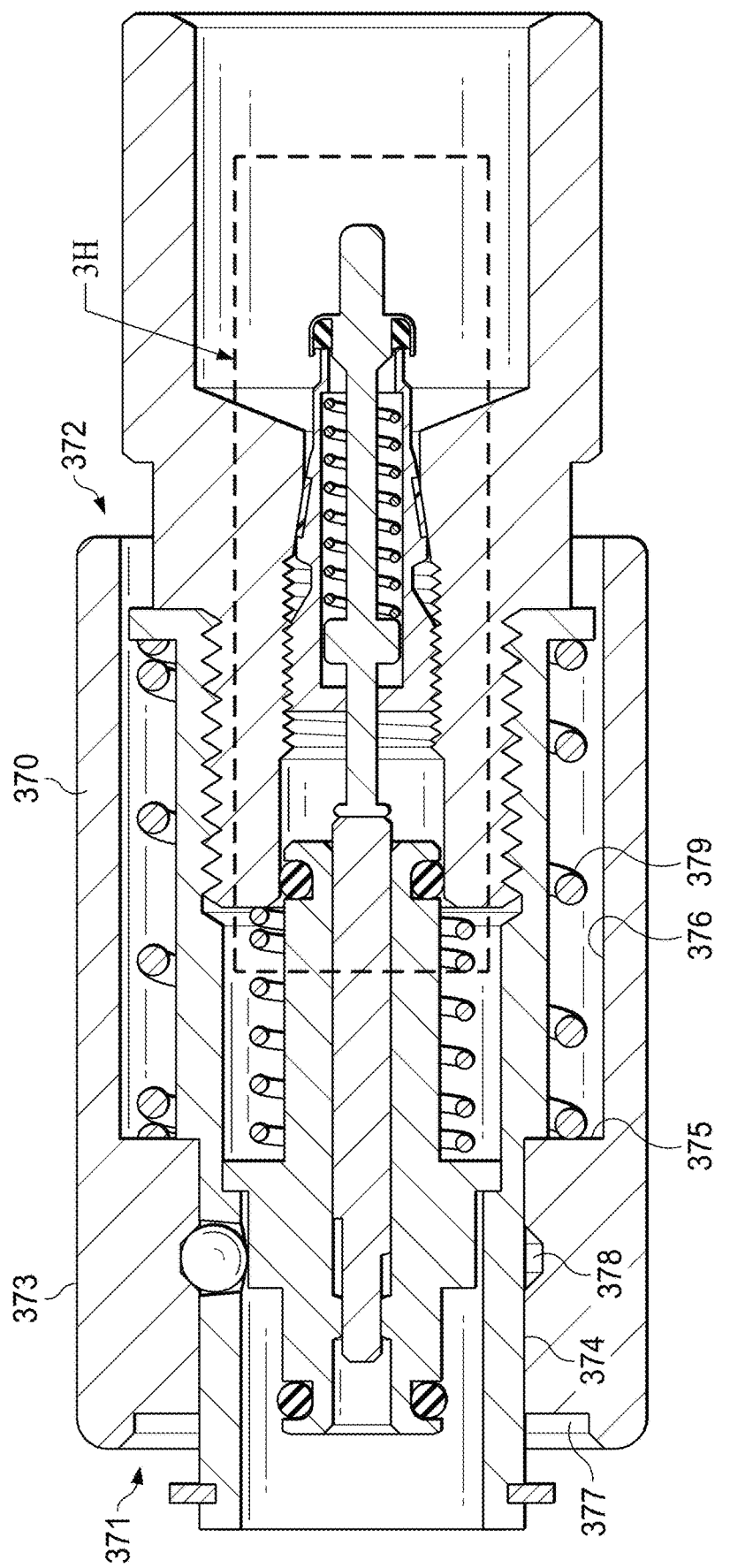
FIG. 3F illustrates cross-sectional views of an embodiment of a chuck system.

As illustrated in FIG. 3F, locking sleeve 370 may surround ball cage 350, and may comprise first end 371, second end 372, and outer surface 373. Locking sleeve 370 may be formed of any suitable metallic or non-metallic material, for example brass, aluminum, or stainless steel. The external profile of locking sleeve 370 may exhibit a uniform surface, while the internal profile of locking sleeve 370 may comprise a number of segments. First internal segment 374 may extend from first end 371 to internal shoulder 375, and may comprise a uniform internal surface which may allow internal segment 374 to remain in slidable contact with ball cage first external segment 353. Internal shoulder 375 may communicate with ball cage external shoulder 354 and may be sized to restrict the travel of locking sleeve 370 along ball cage first external segment 353 and provide a seat adapted to receive biasing element 379. First internal segment 374 may be provided with inner recessed circumferential profile 378 which may be adapted to receive one or more balls 365. Second internal segment 376 may extend from internal shoulder 375 to second end 372, and may comprise a uniform internal surface. Ball cage first end 371 may be formed having recessed profile 377, which may provide a shoulder sized such that retaining ring 363 may communicate with recessed profile 377, in turn restricting the travel of locking sleeve 370 along the outer surface of ball cage 350. In the alternate embodiment illustrated in FIG. 5, locking sleeve outer surface 373 may comprise one or more raised outer profiles 373'.

Locking sleeve biasing element 379 may surround ball cage 350 and may be compressed between the seat formed at internal shoulder 375 and ball cage flange 356, which may bias locking sleeve 370 toward a configuration wherein recessed profile 377 may approach retaining ring 363 when balls 365 may be seated within valve body recessed profile 227, thus releasing locking sleeve 370 to travel along ball cage 350. Locking sleeve biasing element 379 may be formed of any suitable metallic or non-metallic material, for example stainless steel.

Figure 3G:
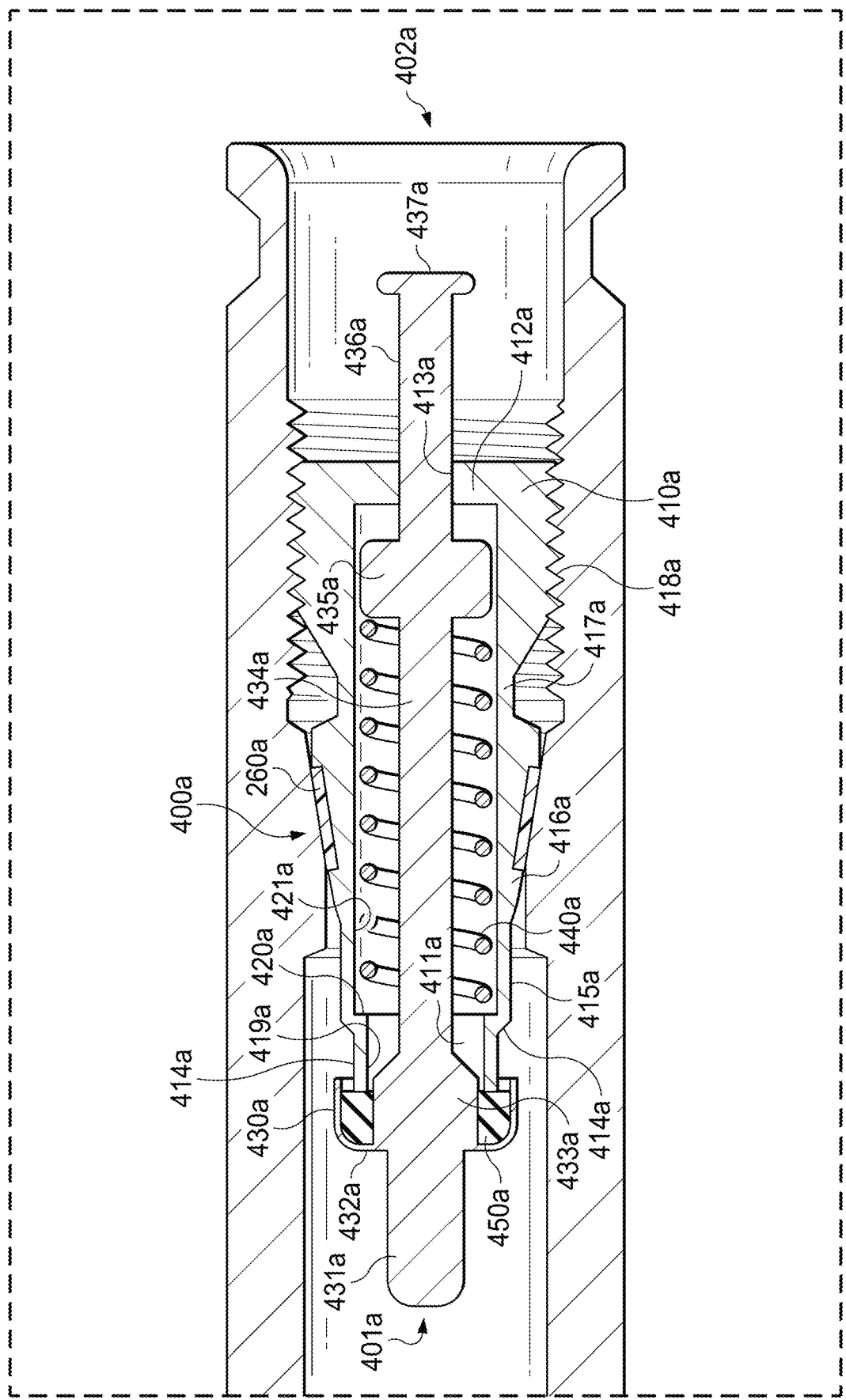
FIG. 3G illustrates cross-sectional views of an embodiment of a gas sampling valve assembly.
Figure 3H:
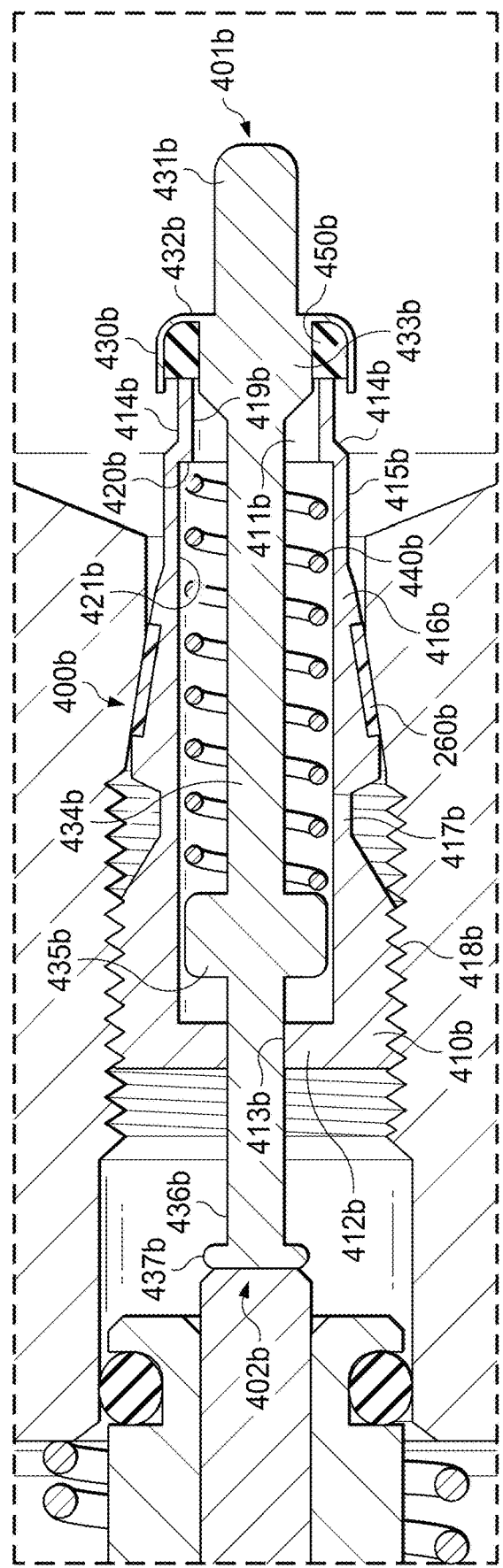
FIG. 3H illustrates cross-sectional views of an embodiment of a gas sampling valve assembly.

As shown in FIG. 3G-3H, core valve 400 a,b may comprise first end 401 a,b and second end 402 a,b, and may further comprise core valve body 410 a,b, core pin 430 a,b, biasing element 440 a,b, and sealing element 450 a,b.

Core valve body 410 a,b may be formed from one or more components, and may be formed of any suitable metallic or non-metallic material, for example brass. Core valve body 410 a,b may provide central cavity 411 a,b which may result from a central bore extending from core valve body first end 401 a,b toward wall 412 a,b disposed at core valve body second end 402 a,b. Wall 412 a,b may comprise aperture 413 a,b located about a central axis of core valve body 410 a,b, which may be adapted to receive a portion of core pin 430 a,b. Core valve body 410 a,b may be formed having an outer surface comprised of a number of segments, each varying in diameter and/or profile. As illustrated in the embodiment shown in FIG. 3G-3H, first segment 414 a,b may extend from core valve body first and 401 a,b and abut second segment 415 a,b, and may have a uniform outer diameter. Second segment 415 a,b may extend from first segment 414 a,b and abut third segment 416 a,b, and may have a uniform outer diameter larger than the diameter of first segment 414 a,b. Third segment 416 a,b, also referred to as core body valve seat 416 a,b, may extend from second segment 415 a,b, with a conical shape increasing in diameter in a direction traversing from second segment 415 a,b toward fourth segment 417 a,b, which may exhibit a profile complimentary to, and adapted to be received by, core valve seat 230,319. In embodiments, one or more core body seals 260 a,b may be disposed between core body valve seat 416 a,b and core valve seat 230,319, conforming to the profile of core valve seat 230,319. Each of the one or more core body seals 260 a,b may be formed from any suitable material, for example Teflon®, which is a registered trademark of E.I. du Pont de Nemours and Company Corporation, and may prevent fluid communication between core body valve seat 416 a,b and core valve seat 230,319. Traversing longitudinally from third segment 416 a,b toward fifth segment 418 a,b, fourth segment 417 a,b may first exhibit a sharp reduction in outer diameter which may be conical in shape, which may be followed by a segment of uniform outer diameter, which may be followed by a final segment which may exhibit a conical shape increase in diameter. The maximum diameter of fourth segment 417 a,b may correspond to diameter de of valve body 220 and chuck body 310. The outer surface profile of fourth segment 417 a,b may compliment valve body inner recessed profile 235. Fifth segment 418 a,b may be formed to allow core valve body 410 a,b to threadedly engage complimentary internal threads 232,321 of valve body 220, core body 310.

Cavity 411 a,b may be formed having an internal profile comprised of a number of segments. First segment 419 a,b may extend from a first end of core valve body 410 a,b and abut internal shoulder 420 a,b, and may have a uniform internal diameter. Shoulder 420 a,b may be formed at a longitudinal location corresponding to a transition from outer surface first segment 414 a,b to outer surface second segment 415 a,b, and may provide a surface sufficient to engage a first end of biasing element 440 a,b. Second segment 421 a,b may extend from shoulder 420 a,b throughout the remainder of cavity 411 a,b, abutting an internal surface of wall 412 a,b, and may exhibit a uniform internal profile adapted to receive biasing element 440 a,b.

Core pin 430 a,b may be formed from one or more components, and may be formed of any suitable metallic or non-metallic material, for example brass. Core pin 430 a,b may comprise a number of segments. Traversing longitudinally, core pin 430 a,b may comprise first segment 431 a,b which may have an enlarged outer diameter and may extend from a first end of core pin 430 a,b and abut flange 432 a,b. Flange 432 a,b may be formed to be partially rolled, providing a lip having an inner surface which may provide a seat for, and communicate with, sealing element 450 a,b. Flange 432 a,b may comprise an outer diameter greater than the outer diameter of core valve body first segment 414 a,b, allowing sealing element 450 a,b to communicate with a radial surface adjacent to core valve body first segment 414 a,b located closest to first end 401 a,b, providing an air or gas tight seal. Second segment 433 a,b may be sized to provide an annular space between second segment 433 a,b and the lip of flange 432 a,b sufficient to securely seat scaling element 450 a,b, and may have a maximum outer diameter smaller than that of core valve body first internal segment 414 a,b. Second segment 433 a,b may exhibit an outer profile conical in shape and reducing in diameter to abut third segment 434 a,b. Third segment 434 a,b may exhibit a uniform outer surface extending from second segment 433 a,b to abut fourth segment 435 a,b. Fourth segment 435 a,b may be formed having an enlarged outer diameter adapted to remain in slidable contact with core valve body inner surface 421 a,b, and may be sized about its longitudinal axis such that it is positioned away from wall 412 a,b when sealing element 450 a,b is fully seated against core valve body 410 a,b. The fifth segment 436 a,b of core pin 430 a,b may be formed having an outer diameter adapted to be received into core valve body aperture 413 a,b, while providing an annular gap between fifth segment 436 a,b and aperture 413 a,b sufficient to provide a desired level of fluid communication through the annular gap. Fifth segment 436 a,b may extend to abut cap 437 a,b, which may act as a stop to prevent core pin 430 a,b from fully entering valve body 410 a,b.

Biasing elements 440 a,b may be compressed between core valve body internal shoulder 420 a,b and core pin fourth segment 435 a,b, which may bias core valve 400 a,b into a first, or closed, configuration having sealing element 450 a,b compressed between an interior surface of flange 432 a,b and a first end of core valve body 410 a,b. In this manner, the interior surface of flange 432 a,b may be biased to communicate with sealing element 450 a,b, which in turn may communicate with the first end of core valve body 410 a,b, forming an air or gas tight seal. Biasing element 440 a,b may be any suitable biasing element capable of biasing core pin 430 a,b into a first closed position under vacuum, for example, biasing element 440 a,b may be a spring. Biasing element 440 a,b may be formed of any suitable metallic material, for example stainless steel.

Sealing element 450 a,b, which may also be referred to as core gasket 450 a,b, may be any suitable sealing element sufficient to prevent fluid communication through core valve body 410 a,b when in a fully seated configuration, and may be formed from any suitable material, for example Teflon®, nitrile rubber, viton, silicone, or any suitable elastomer.

Under operational conditions, valve assembly 200, being disposed at container second end 112, may be inserted into chuck system 300, which may progress through a number of intermediate seating relationships until becoming fully seated.

Figure 4A:
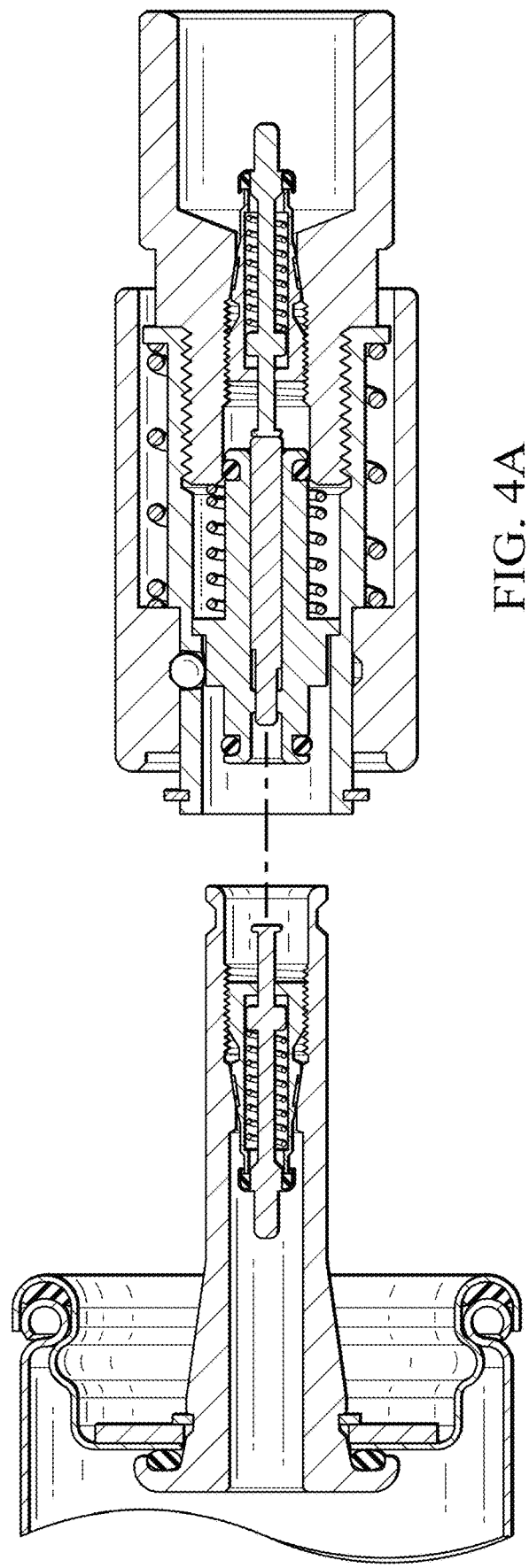
FIG. 4A illustrates a cross-sectional view of a first transitional seating relationship between embodiments of a gas sampling valve assembly and chuck system.
Figure 4B:
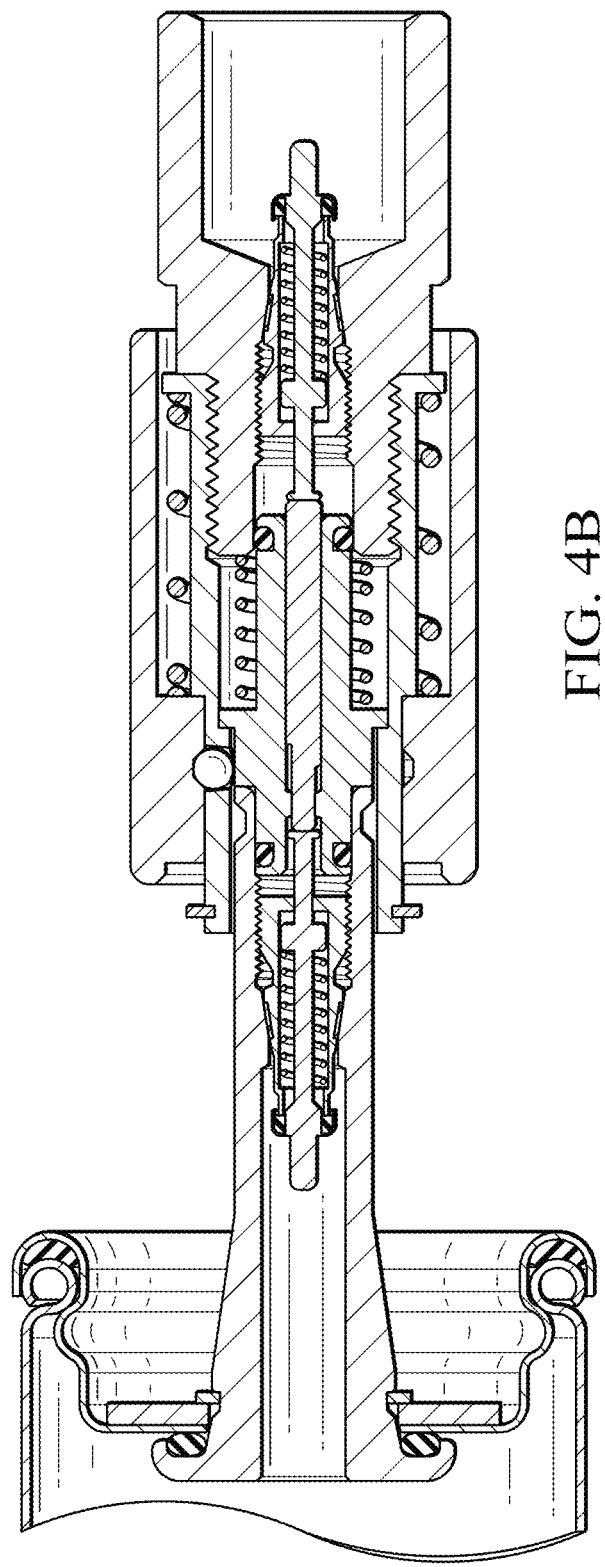
FIG. 4B illustrates a cross-sectional view of a second transitional seating relationship between embodiments of a gas sampling valve assembly and chuck system.

As illustrated by FIGS. 4A-B, valve assembly 200 may begin to be transitioned toward a fully seated configuration, wherein valve assembly second end 202 may be introduced into ball cage first end 351, and progressively inserted such that transfer tube first end 331 is introduced into valve body second end 222, with transfer tube sealing element 343 a slidably engaging valve body internal surface 234.

At a first intermediate seating relationship illustrated by FIG. 4B, a surface of valve body second end 222 may become seated against transfer tube external shoulder 334 as a surface of transfer tube first end 331 may become seated against valve body internal shoulder 233, which may coincide with the first end of transfer tube pin 344 engaging core pin cap 437 a. In this manner, as valve assembly 200 continues to be transitioned toward a fully seated configuration, valve body second end 222 may cause transfer tube 330 to become unseated from a first, biased position thus releasing transfer tube external shoulder 336 from being in contact with ball cage internal shoulder 358.

Figure 4C:
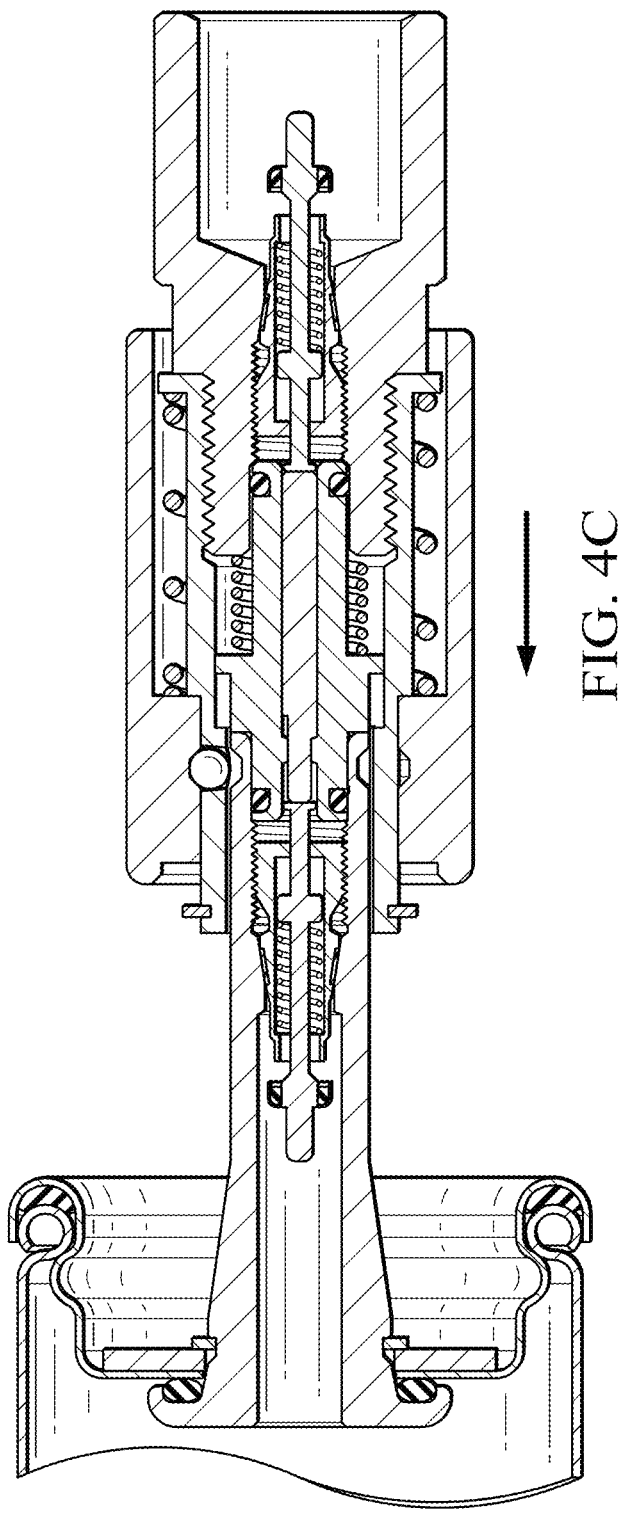
FIG. 4C illustrates a cross-sectional view of a third transitional seating relationship between embodiments of a gas sampling valve assembly and chuck system.

Valve assembly 200 and chuck system 300 may then progress through a second, transitory intermediate seating relationship depicted in FIG. 4C. As transfer tube 330 is progressively positioned away from its initial, biased position, transfer tube third segment 337 may approach chuck body second end 312 at a rate determined by transfer tube biasing element 347. Simultaneously, transfer tube pin 344, being positioned between and in resting contact against both core valve pin caps 437 a,b, may be caused to shift within transfer tube 330 at a rate determined by, and in balance between, core valve biasing elements 440 a,b. As valve assembly 200 continues to be inserted into chuck system 300, each of the core pins 430 a,b may be displaced from their first, biased position, which may in turn cause core valve sealing elements 450 a,b to become unseated from core valve body 410 a,b, thus forming a channel allowing fluid communication through central cavities 411 a,b and the annular gap formed between transfer tube 330 and pin 344. During this transitory seating relationship, transfer tube sealing element 343 b may remain in slidable engagement with chuck body internal surface 323, thus preventing fluid communication between transfer tube 330 and chuck body 310.

As shown, a surface of transfer tube second end 332 may become seated against chuck body internal shoulder 322, which may allow each of the one or more balls 365 to align with valve body outer recessed circumferential profile 227. At this intermediate seating relationship, core pins 430 a,b may be positioned in a second, open position which may allow fluid communication between the internal volume of fluid container 100 and an internal volume formed by chuck body internal surface 318.

Figure 4D:
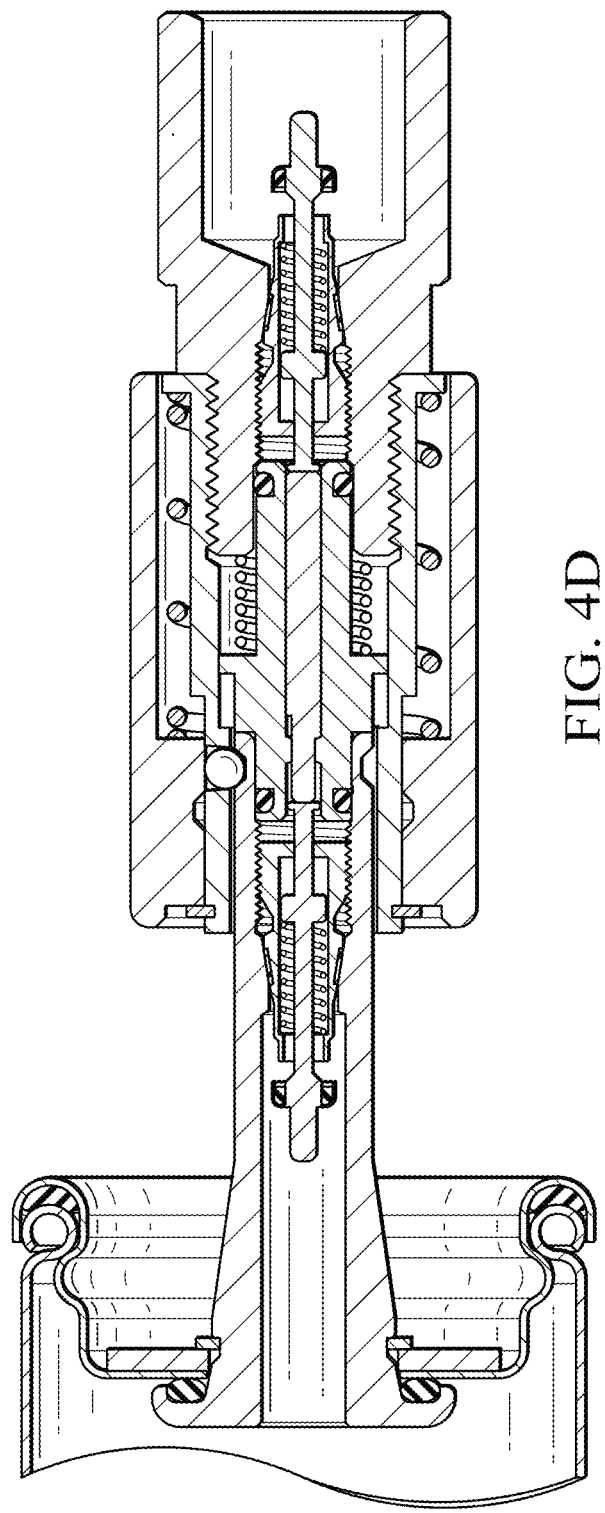
FIG. 4D illustrates a cross-sectional view of a fourth transitional seating relationship between embodiments of a gas sampling valve assembly and chuck system.

At a third intermediate seating relationship illustrated by FIG. 4D, chuck system locking sleeve 370 may be encouraged by biasing element 379 to slidably transition from a first position wherein recessed circumferential profile 378 is aligned with the one or more ball cage apertures 364 to a second position wherein each of the one or more balls 365 are trapped in a position partially within valve body outer recessed circumferential profile 227 by an internal surface of locking sleeve internal segment 374, thus locking valve assembly 200 with chuck system 300.

During removal of container 100 from chuck system 300, the process just described may be reversed, whereby locking sleeve 370 may be slidably transitioned to the first position which in turn may free each of the one or more balls 365 from valve body outer recessed circumferential profile 227, which in turn may allow valve assembly 200 to be removed from chuck system 300. As container 100 progresses in being removed from chuck system 300, transfer tube biasing element 347 may cause transfer tube 330 to be returned to the first, biased position having transfer tube external shoulder 336 returned to be seated against ball cage internal shoulder 358. Similarly, core valve biasing elements 440 a,b may cause core pins 430 a,b to be returned to the first, biased position having core valve sealing elements 450 *a,b* seated against core valve body 410 *a,b*, thus suspending fluid communication through central cavities 411 *a,b* and the annular gap formed between transfer tube 330 and pin 344.

In the alternate embodiment illustrated in FIG. 5, valve assembly 200 may begin to be transitioned toward a fully seated configuration into chuck system 300', wherein valve assembly second end 202 may be introduced into ball cage first end 351, and progressively inserted such that transfer tube first end 331 is introduced into valve body second end 222, with transfer tube sealing element 343 *a* slidably engaging valve body internal surface 234. At a first intermediate seating relationship, raised internal profile 340' may engage core pin cap 437 *a*. As valve assembly 200 continues to be inserted into chuck system 300', core valve pin 344 may be displaced from the first, biased position, which may in turn cause core valve sealing element 450 *a* to become unseated from the radial surface adjacent to core valve body first segment 414 *a* located closest to first end 401 *a*. At a second intermediate seating relationship, a surface of transfer tube second end 332 may become seated against chuck body internal shoulder 322, which may allow each of the one or more balls 365 to align with valve body outer recessed circumferential profile 227. Following this second intermediate seating relationship, core pin 430 1 may be positioned in a second, open position which may allow fluid communication between the internal volume of fluid container 100 and an internal volume formed by chuck body internal surface 318. At a third intermediate seating relationship, chuck system locking sleeve 370 may be encouraged by biasing element 379 to slidably transition from a first position wherein recessed circumferential profile 378 is aligned with the one or more ball cage apertures 364 to a second position wherein each of the one or more balls 365 are trapped in a position partially within valve body outer recessed circumferential profile 227 by an internal surface of locking sleeve internal segment 374, thus locking valve assembly 200 with chuck system 300'. During removal of container 100 from chuck system 300', the process just described may be reversed.

Although the present invention and its advantages have been described in detail, it should be understood that various changes, substitutions, and alterations may be made herein without departing from the spirit and scope of the invention as defined by the appended claims.

What is claimed is:

1. A system for obtaining a fluid sample, comprising:
   a fluid container comprising a valve assembly, the valve assembly comprising a first core valve, wherein a pin of the first core valve is biased to a first, closed position; and
   a fluid sampling apparatus comprising a chuck system, the chuck system comprising:
     a transfer tube and second core valve, wherein a pin of the second core valve is biased to a first closed position;
     a locking sleeve surrounding at least a portion of the transfer tube and biased toward a first position; and
     a ball cage disposed between the locking sleeve and the transfer tube, the ball cage surrounding at least a portion of the transfer tube and provided with at least one aperture located in proximity to the portion of the ball cage surrounding the transfer tube; and
   at least one ball captured in the at least one aperture of the ball cage, wherein the radial position of the ball in relation to a centerline axis of the ball cage is defined by a longitudinal position of the locking sleeve in relation to the ball cage, a recessed circumferential profile of the locking sleeve, a longitudinal position of the transfer tube in relation of the ball cage, an outer surface of the transfer tube, or combinations thereof;
   wherein a pin of the transfer tube is configured to displace the pins of the first and second core valves each to a second, open position upon the valve assembly being seated into the chuck system, thereby isolating a fluid communication path between the first and second core valves.

2. The system for obtaining a fluid sample of claim 1, wherein the radial position of the ball is further defined by a recessed circumferential profile of the valve assembly when the valve assembly is seated into the chuck system.

3. The system for obtaining a fluid sample of claim 2, wherein the ball is secured against the recessed circumferential profile of the valve assembly when the locking sleeve is transitioned to a second position.

4. A system for obtaining a fluid sample, comprising:
   a fluid container comprising a valve assembly, the valve assembly comprising a core valve, wherein a pin of the core valve is biased to a first, closed position; and
   a fluid sampling apparatus comprising a chuck system, the chuck system comprising a transfer tube, said transfer tube comprising a central bore with a raised internal profile;
   wherein the raised internal profile of the transfer tube is configured to displace the pin of the core valve to a second, open position upon the valve assembly being seated into the chuck system, thereby isolating a fluid communication path between the first core valve and the chuck system.

5. The system for obtaining a fluid sample of claim 4, wherein the chuck system further comprises a locking sleeve surrounding at least a portion of the transfer tube, and the locking sleeve is biased toward a first position.

6. The system for obtaining a fluid sample of claim 5, wherein the chuck system further comprises a ball cage disposed between the locking sleeve and the transfer tube, the ball cage surrounding at least a portion of the transfer tube, and wherein the ball cage is provided with at least one aperture located in proximity to the portion of the ball cage surrounding the transfer tube.

7. The system for obtaining a fluid sample of claim 6, further comprising at least one ball captured in the at least one aperture of the ball cage, wherein the radial position of the ball in relation to a centerline axis of the ball cage is defined by a longitudinal position of the locking sleeve in relation to the ball cage, a recessed circumferential profile of the locking sleeve, a longitudinal position of the transfer tube in relation of the ball cage, an outer surface of the transfer tube, or combinations thereof.

8. The system for obtaining a fluid sample of claim 7, wherein the radial position of the ball is further defined by a recessed circumferential profile of the valve assembly when the valve assembly is seated into the chuck system.

9. The system for obtaining a fluid sample of claim 8, wherein the ball is secured against the recessed circumferential profile of the valve assembly when the locking sleeve is transitioned to a second position.

10. A method of collecting a fluid sample, comprising:
    providing a fluid container comprising a valve assembly, the valve assembly comprising a core valve, wherein a pin of the core valve is biased to a first closed position;

providing a fluid sampling apparatus comprising a chuck system, the chuck system comprising a transfer tube, said transfer tube comprising a central bore with a raised internal profile, wherein the raised internal profile of the transfer tube is configured to displace the pin of the core valve of the valve assembly to a second, open position upon the valve assembly being seated into the chuck system, thereby isolating a fluid communication path between an interior volume of the fluid container and the chuck system through the core valve; and seating the valve assembly of the fluid container into the chuck system of the fluid sampling apparatus in a manner which displaces the pin of the core valve, thereby forming the fluid communication path.

11. The method of claim 10, wherein the chuck system further comprises a chuck core valve, wherein a pin of the chuck core valve is biased to a first closed position, and wherein the pin of the transfer tube is further configured to displace the pin of the chuck core valve to a second, open position upon the valve assembly being seated into the chuck system, thereby isolating a fluid communication path between an interior volume of the fluid container and the chuck system through the core valve and the chuck core valve.

12. The method of claim 10, wherein the seating comprises transitioning a locking sleeve of the chuck system from a first position along a centerline axis of the chuck system to a second position along the centerline axis of the chuck system.

13. The method of claim 12, wherein the seating further comprises locking a ball of the chuck system against a recessed circumferential profile of the valve assembly when the locking sleeve is located in the second position.

14. The system of claim 4, wherein the transfer tube comprises a substantially cylindrical first end configured to engage the valve assembly.

15. The system of claim 14, further comprising a sealing member disposed on an outer surface of the first end of the transfer tube and configured to engage an inner surface of the valve assembly.

* * * * *